(12) United States Patent
Reierson et al.

(10) Patent No.: US 9,588,751 B2
(45) Date of Patent: *Mar. 7, 2017

(54) APPLICATION VIRTUALIZATION

(71) Applicant: MICROSOFT TECHNOLOGY LICENSING, LLC, Redmond, WA (US)

(72) Inventors: Kristofer Reierson, Acton, MA (US); Feroz Gora, Walpole, MA (US); Charles Kossi Kekeh, Boston, MA (US); Peter A. Morgan, Allston, MA (US); Joseph W. Rovine, Boston, MA (US); John M. Sheehan, Cambridge, MA (US); Lidiya Vikhlyayeva, Revere, MA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/854,022

(22) Filed: Mar. 29, 2013

(65) Prior Publication Data
US 2013/0227546 A1 Aug. 29, 2013

Related U.S. Application Data

(63) Continuation of application No. 12/437,691, filed on May 8, 2009, now Pat. No. 8,413,136.

(51) Int. Cl.
*G06F 9/445* (2006.01)
*G06F 7/00* (2006.01)

(52) U.S. Cl.
CPC ............ *G06F 8/61* (2013.01); *G06F 9/44505* (2013.01); *G06F 2209/542* (2013.01)

(58) Field of Classification Search
CPC ..... G06F 8/60; G06F 8/61; G06F 8/65; G06F 9/4411; G06F 9/44505
(Continued)

(56) References Cited

U.S. PATENT DOCUMENTS 5,276,738 A * 1/1994 Hirsch ............................ 380/46
5,968,136 A 10/1999 Saulpaugh et al.
(Continued)

OTHER PUBLICATIONS

"Final Office Action Received for U.S. Appl. No. 13/854,019", Mailed Date: May 21, 2015, 37 Pages.
(Continued)

*Primary Examiner* — Li B Zhen
*Assistant Examiner* — Mohammad Kabir
(74) *Attorney, Agent, or Firm* — Kate Drakos; Henry Gabryjelski; Micky Minhas

(57) ABSTRACT

A virtual application packaged for a specific executing environment may be executed on a processing device having an executing environment different from the specific executing environment. A reference, included in extracted installer metadata, to one or more key paths of a hierarchically-structured data store may be modified according to a set of rules related to the executing environment detected in the processing device. The modified extracted installer metadata may be provided to an installer for installing the virtual application. During execution of the virtual application, a request to read, write, or modify the hierarchically-structured data store may be intercepted and changed, such that a first key path included in the request may be mapped to a second key path, based on the detected executing environment. Similarly, a response to the request, which may include the second key path, may be intercepted and modified, to the first key path.

21 Claims, 7 Drawing Sheets

(58) Field of Classification Search
USPC .................................................. 717/174–178
See application file for complete search history.

(56) References Cited

U.S. PATENT DOCUMENTS

| | | | |
|---|---|---|---|
| 6,253,240 B1 | 6/2001 | Axberg et al. | |
| 6,446,255 B1* | 9/2002 | Curtis et al. | 717/121 |
| 6,922,735 B2 | 7/2005 | Chang | |
| 7,051,315 B2* | 5/2006 | Artzi et al. | 717/103 |
| 7,171,543 B1 | 1/2007 | Ronen et al. | |
| 7,260,702 B2 | 8/2007 | Vega et al. | |
| 7,406,676 B2 | 7/2008 | Khalid et al. | |
| 7,818,160 B2 | 10/2010 | Collins et al. | |
| 8,127,292 B1* | 2/2012 | Dobrovolskiy et al. | 718/104 |
| 8,544,016 B2* | 9/2013 | Friedman et al. | 718/104 |
| 8,776,038 B2* | 7/2014 | Larimore et al. | 717/168 |
| 2003/0030664 A1* | 2/2003 | Parry | 345/744 |
| 2004/0151018 A1* | 8/2004 | Chen et al. | 365/145 |
| 2005/0114300 A1* | 5/2005 | Khalid | G06F 9/44505 |
| 2005/0177710 A1* | 8/2005 | Rothman | G06F 9/44505 713/2 |
| 2006/0026577 A1* | 2/2006 | Dinechin et al. | 717/148 |
| 2006/0048136 A1 | 3/2006 | Vries et al. | |
| 2006/0282606 A1 | 12/2006 | Radhakrishnan et al. | |
| 2007/0050487 A1 | 3/2007 | Pravat et al. | |
| 2007/0136241 A1* | 6/2007 | Hughes | G06F 9/44505 |
| 2008/0098387 A1* | 4/2008 | Lo et al. | 717/174 |
| 2008/0133789 A1 | 6/2008 | McNutt et al. | |
| 2009/0031102 A1* | 1/2009 | Peak et al. | 711/203 |
| 2009/0064133 A1* | 3/2009 | Suchy et al. | 717/177 |
| 2009/0228881 A1* | 9/2009 | Mukker et al. | 717/176 |
| 2010/0011351 A1* | 1/2010 | Tsvi | G06F 3/0607 717/174 |
| 2011/0126192 A1* | 5/2011 | Frost et al. | 717/178 |
| 2011/0271269 A1 | 11/2011 | Tazzari | |
| 2011/0314187 A1 | 12/2011 | Albrecht et al. | |

OTHER PUBLICATIONS

U.S. Appl. No. 12/437,691, filed May 8, 2009, Reierson.
U.S. Appl. No. 13/854,019, filed Mar. 29, 2013, Reierson.
"WOW64", Retrieved at<<http://en.wikipedia.org/wiki/WOW64>>, From Wikipedia, the free encyclopedia, pp. 2.
Posey Brien M. "Run 32-bit Applications on x64 Windows Servers", Retrieved at<<http://searchwindowsserver.techtarget.com/tip/0,289483,sid68_gci1218185,00.html>>, Sep. 27, 2006, pp. 4.
"64-bit", Retrieved at<<http://en.wikipedia.org/wiki/64-bit>>, From Wikipedia, the free encyclopedia, pp. 8.
"Introduction to Developing Applications for the 64-bit Itanium-based Version of Windows", Retrieved at<<http://msdn.microsoft.com/en-us/library/ms952405.aspx>>, Windows Server 2003 Technical Articles, Jun. 2003, pp. 18.
Cleveland Sean,"Advanced Micro Devices, Inc.x86-64TM Technology White Paper", Retrieved at<<http://www.weblearn.hs-bremen.de/risse/RST/docs/amd64.pdf>>, pp. 1-36.

* cited by examiner

APPLICATION VIRTUALIZATION

BACKGROUND

Some operating systems use a registry to store system settings, user settings, operating system options, as well as other information. The registry is a database, in a form of a hierarchically-structured data store, which may include information pertaining to hardware, operating system software, application software, and settings per user.

The registry may include keys and values. Registry keys are analogous to folders or directories and values are analogous to files. Each registry key may include one or more other registry keys (subkeys) and/or one or more values. For example, a Windows operating system, available from Microsoft Corporation of Redmond, Wash., may have a registry key path of "HKEY_LOCAL_MACHINE\Software\Microsoft\Windows", which refers to a key "Windows", which is a subkey of a key "Microsoft", which is a subkey of a key "Software", which is a subkey of a key "HKEY_LOCAL_MACHINE". A registry value may have a name and data associated with the name.

Software applications may expect installation metadata, such as values (e.g., registry files) or registry entries to be in particular locations. If the registry files or registry entries are not in the particular locations, then a software application may not function correctly.

Some operating systems may be 32-bit operating systems and other operating systems may be 64-bit operating systems. Typically, a 32-bit application may execute on a processing device running a 32-bit operating system and a 64-bit application may execute a processing device running a 64-bit operating system.

A virtual application may be an application packaged to execute in a virtual environment. For example, a 32-bit virtual application may execute on a subsystem for executing 32-bit virtual applications. The subsystem may be included within a 64-bit operating system running on a processing device. One example of such a subsystem is WOW64, which is a subsystem of a 64-bit Windows operating system. Because 32-bit applications and 64-bit applications may coexist on one processing device, use of a particular registry key path by a 32-bit application and a 64-bit application on one processing device may cause one or both of the 32-bit application and the 64-bit application to function incorrectly.

In order to solve this problem, 32-bit applications packaged to execute on a processing device running a 64-bit operating system may refer to one or more particular registry key paths that are different than corresponding registry key paths used by 64-bit applications. For example, a 64-bit application packaged to execute on a processing device running a 64-bit operating system and a 32-bit application packaged to execute on a processing device running a 32-bit operating system may refer to a registry key path of "Registry\HKLM\Software\Contoso". However, a 32-bit virtual application packaged to execute on a processing device running a 64-bit operating system, with a subsystem for executing 32-bit applications, may be packaged such that the 32-bit virtual application refers to a modified version of the above-mentioned registry key path, such as, for example, "Registry\HKLM\Software\Wow6432Node\Contoso" or other registry key path.

Because one or more modified registry key paths may be used by a 32-bit virtual application when executing on a processing device having a 64-bit operating system, for the 32-bit virtual application to function properly on the processing device, the 32-bit virtual application may be packaged specifically, as a virtual application, for execution on the processing device having the 64-bit operating system. When the 32-bit virtual application is to be executed on a processing device having another operating system, such as a 32 bit operating system, the 32-bit virtual application may be packaged specifically for execution on the processing device having the 32-bit operating system (i.e., no registry key paths may be modified).

Enterprises with an existing library of 32-bit applications may repackage each of the 32-bit applications, as virtual applications, for execution on a processing device with a 64-bit operating system if the 32-bit applications are to run properly on the processing device with the 64-bit operating system. If the existing library of 32-bit applications are also to be executed on a second processing device having a new version of a 64-bit operating system, the 32-bit applications may be repackaged as virtual applications to execute on the second processing device having the new version of the 64-bit operating system (i.e., one or more registry key paths may be modified differently than the one or more registry key paths would be modified for execution on a processing device running a different version of the 64-bit operating system).

Maintaining an application that is repackaged multiple times to execute properly as virtual applications in a number of different executing environments on various processing devices may be time consuming and expensive.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

In embodiments consistent with subject matter of this disclosure, a processing device having a first executing environment may execute a virtual application packaged to execute in a second executing environment, which is different from the first executing environment. Applications packaged to work in the first executing environment and virtual applications packaged to work in the second executing environment may read, write, or modify one or more locations within a hierarchically-structured data store. The one or more locations may be specified via respective key paths of the hierarchically-structured data store. Before installing a virtual application on the processing device, installer metadata associated with the virtual application may be extracted. The extracted installer metadata may include a reference to one or more key paths of the hierarchically-structured data store. At least some of the one or more key paths in the extracted installer metadata may be modified based on an executing environment of the processing device. The modified extracted installer metadata may be provided to an installer, which may create one or more key paths of the hierarchically-structured data store based on the provided modified extracted installer metadata.

During execution of the virtual application, a request, from the virtual application, to read, write, or modify the hierarchically-structured data store may be intercepted to determine whether the request includes a reference to a key path of the hierarchically-structured data store, which is to be modified. If so, the reference to the key path may be modified based on the executing environment detected in the processing device. Similarly, a response to the request from the virtual application may be intercepted to determine whether the intercepted response includes a reference to a key path of the hierarchically-structured data store to be modified back to an original key path included in the request. If the reference to the key path included in the intercepted response is to be modified, then the key path may be modified to the original key path included in the request. The modified intercepted response may be released, such that the virtual application may receive the modified intercepted response.

In some embodiments, the detected executing environment of the processing device may be matched to one of a number of sets of rules. Each of the sets of rules may include information regarding a mapping of a first key path of the hierarchically-structured data store to a second key path of the hierarchically-structured data store and vice versa.

DRAWINGS

In order to describe the manner in which the above-recited and other advantages and features can be obtained, a more particular description is provided below and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

DETAILED DESCRIPTION

Figure 1:
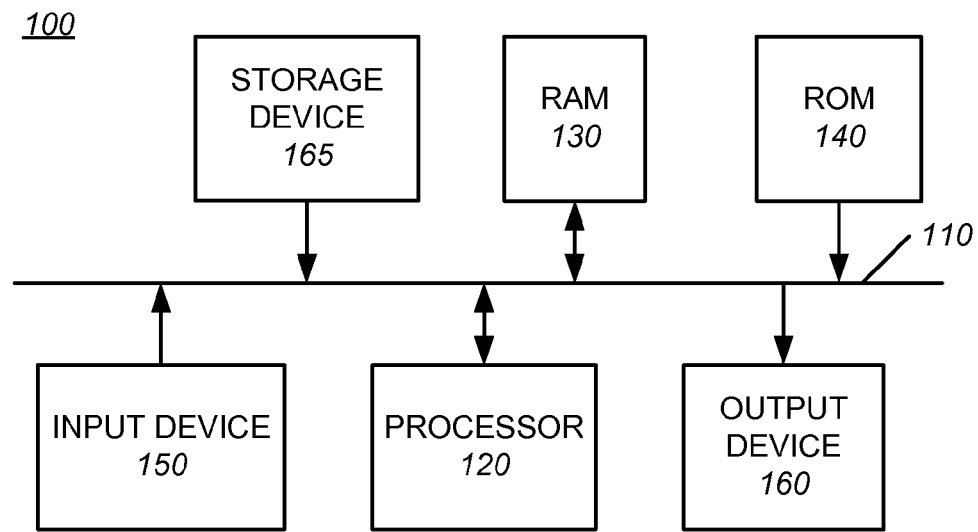
FIG. 1 illustrates an exemplary processing device which may implement embodiments consistent with the subject matter of this disclosure.

Embodiments are discussed in detail below. While specific implementations are discussed, it is to be understood that this is done for illustration purposes only. A person skilled in the relevant art will recognize that other components and configurations may be used without parting from the spirit and scope of the subject matter of this disclosure.

Overview

In embodiments consistent with the subject matter of this disclosure, an application may be packaged as a 32-bit virtual application for execution on a processing device running a 32-bit operating system. The 32-bit virtual application may execute on either a processing device running a 32-bit operating system or a processing device running a 64-bit operating system without repackaging the virtual application.

In various embodiments, installer metadata associated with a virtual application may be extracted from the packaged virtual application. The installer metadata may include information regarding a number of keys of a hierarchically-structured data store, such as, for example, a registry, or other hierarchically-structured data store. At least one key path, included in the extracted installer metadata, may be modified based on a detected executing environment for the virtual application on a processing device. The modified extracted installer metadata may be provided to an installer, which may create at least one key path in the hierarchically-structured data store. The at least one key path may correspond to the modified extracted installer metadata.

When the virtual application is executed, a request, from the virtual application, to read, write, or modify a value in the hierarchically-structured data store may be intercepted. The request may be analyzed to determine whether the request includes a reference to one of the at least one key path. If the request includes the reference, then the reference to the one of the at least one key path may be modified, as defined for the executing environment on the processing device. The modified request may then be processed to read, write, or modify a value in the hierarchically-structured data store at a location defined by the modified one of the at least one key path.

A response to the modified request may be intercepted and analyzed to determine whether the response includes a second reference to one of at least one modified key path of the hierarchically-structured data store. If the response includes the second reference, then the second reference to the one of the at least one modified key path may be modified back to the one of the at least one key path included in the request before being modified. The response including the modified second reference may then be provided to the virtual application.

In some embodiments, an executing environment of a processing device may be detected by reading a particular memory address or group of memory addresses, by accessing a location of a hierarchically-structured data store, such as, for example, a registry or other hierarchically-structured data store, or by other methods. The detected executing environment may then be matched to one of a number of sets of rules for a number of executing environments. When the detected executing environment matches one of the number of sets of rules, the matching one of the number of sets of rules may include information for mapping a first key path referenced by a virtual application to a second key path based on the detected executing environment. In some embodiments, the sets of rules may include one or more modifiers for use in modifying one or more key path references of a hierarchically-structured data store.

For example, a set of rules matching to an executing environment including version 2.3 of a 64-bit operating system may have a modifier indicating that a request having a key path of "Registry\HKLM\Software\Contoso" is to be modified to have a key path of "Registry\HKLM\Software\Wow6432Node\Contoso". Conversely, the modifier may indicate that a response to a request, having a key path of "Registry\HKLM\Software\Wow6432Node\Contoso", is to be modified to have a key path of "Registry\HKLM\Software\Contoso". A second set of rules matching an executing environment including version 3.0 of a 64-bit operating system may have a second modifier indicating that a request having a key path of "Registry\HKLM\Software\Contoso" is to be modified to have a key path of "Registry\HKLM\Software\Bam7865Dev\Contoso". Conversely, the second modifier may indicate that a response to a request, having a key path of "Registry\HKLM\Software\ Bam7865Dev\Contoso", is to be modified to have a key path of "Registry\HKLM\Software\Contoso".

Exemplary Processing Device

FIG. 1 is a functional block diagram of an exemplary processing device 100, which may be used to implement embodiments consistent with the subject matter of this disclosure. Processing device 100 may include a bus 110, a processor 120, a random access memory (RAM) 130, a read only memory (ROM) 140, an input device 150, an output device 160, and a storage device 165. Bus 110 may permit communication among components of processing device 100.

Processor 120 may include one or more conventional processors that interpret and execute instructions. A memory may include RAM 130, ROM 140, or another type of dynamic or static storage device that stores information and instructions for execution by processor 120. RAM 130, or another type of dynamic storage device, may store instructions as well as temporary variables or other intermediate information used during execution of instructions by processor 120. ROM 140, or another type of static storage device, may store static information and instructions for processor 120.

Input device 150 may include a keyboard, a pointing device, an electronic pen, a touchscreen, or other device for providing input. Output device 160 may include a display, a printer, or other device for outputting information. Storage device 165 may include a disk and disk drive, an optical medium, or other medium for storing data and/or instructions.

Processing device 100 may perform functions in response to executing sequences of instructions contained in a tangible machine-readable medium, such as, for example, RAM 130, ROM 140 or other medium. Such instructions may be read into RAM 130 from another machine-readable medium or from a separate device via a communication interface (not shown).

Exemplary Hierarchically-Structured Data Store

Figure 2:
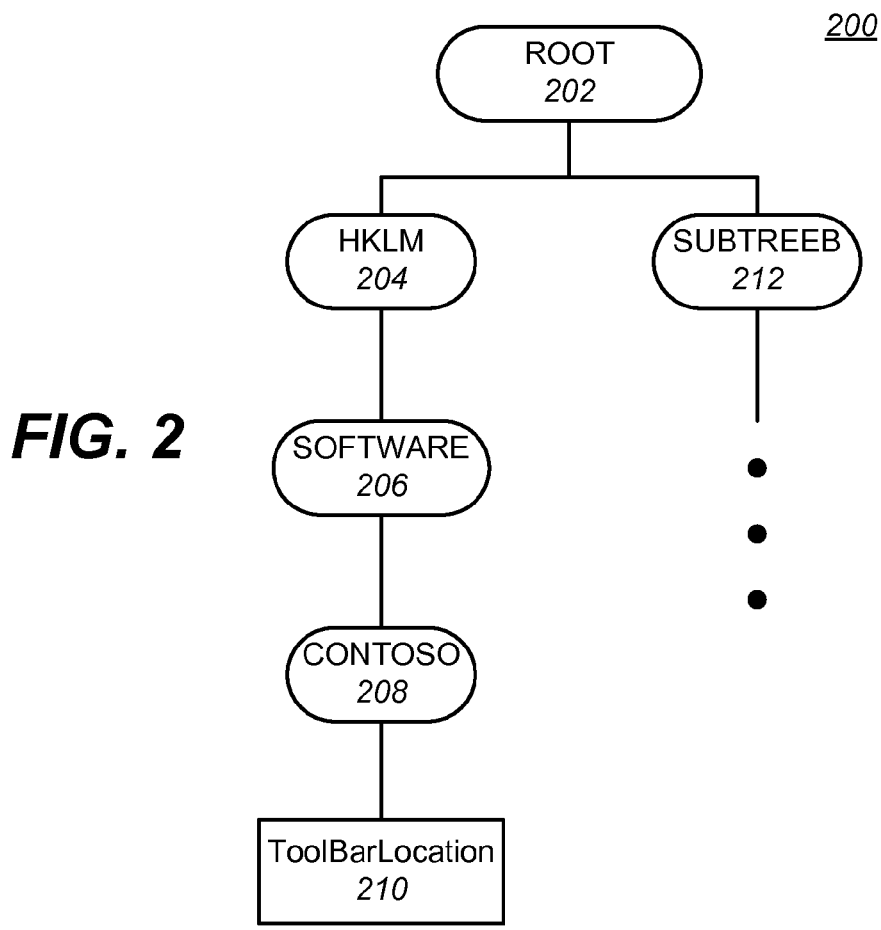
FIGS. 2 and 3 show two exemplary hierarchically-structured data stores.

FIG. 2 illustrates an exemplary hierarchically-structured data store 200. Hierarchically-structured data store 200 may have a ROOT key 202, a HKLM key 204, a SOFTWARE key 206, and a CONTOSO key 208. CONTOSO key 208 is a subkey to SOFTWARE key 206, which is a subkey to HKLM key 204, which is a subkey to ROOT key 202. A value named ToolBarLocation 210 may be stored in hierarchically-structured data store 200 at a location defined by a key path "HKLM\ROOT\SOFTWARE\CONTOSO". Hierarchically-structured data store 200 may have other key paths, such as, a second key path including ROOT 202, SUBTREEB 212, and other keys (not shown).

Figure 3:
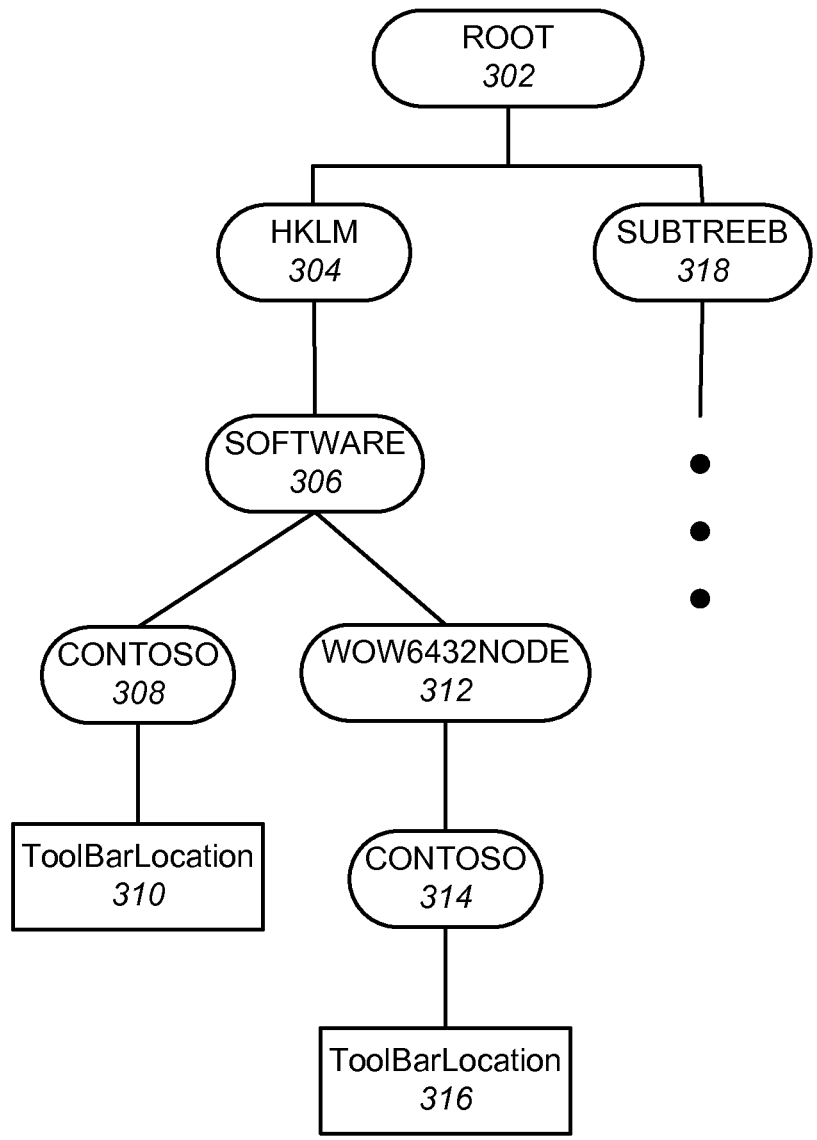

FIG. 3 illustrates a second exemplary hierarchically-structured data store 300, which may be used by, for example, 32-bit virtual applications executing in an executing environment including a 64 bit operating system, in an embodiment. In this example, 64-bit applications executing in the executing environment may refer to ToolBarLocation 310 at a location defined by a key path including ROOT 302, HKLM 304, SOFTWARE 306, and CONTOSO 308. The 32-bit virtual applications executing in the executing environment may refer to ToolBarLocation 316 at a second location defined by a second key path including ROOT 302, HKLM 304, SOFTWARE 306, WOW6432NODE 312, and CONTOSO 314. Hierarchically-structured data store 200 may have other key paths, such as, a third key path including ROOT 302, SUBTREEB 318, and other keys (not shown). One can easily see that data associated with value ToolBarLocation 310 will not affect applications that refer to value ToolBarLocation 316, and vice versa.

Functional Block Diagrams

Figure 4:
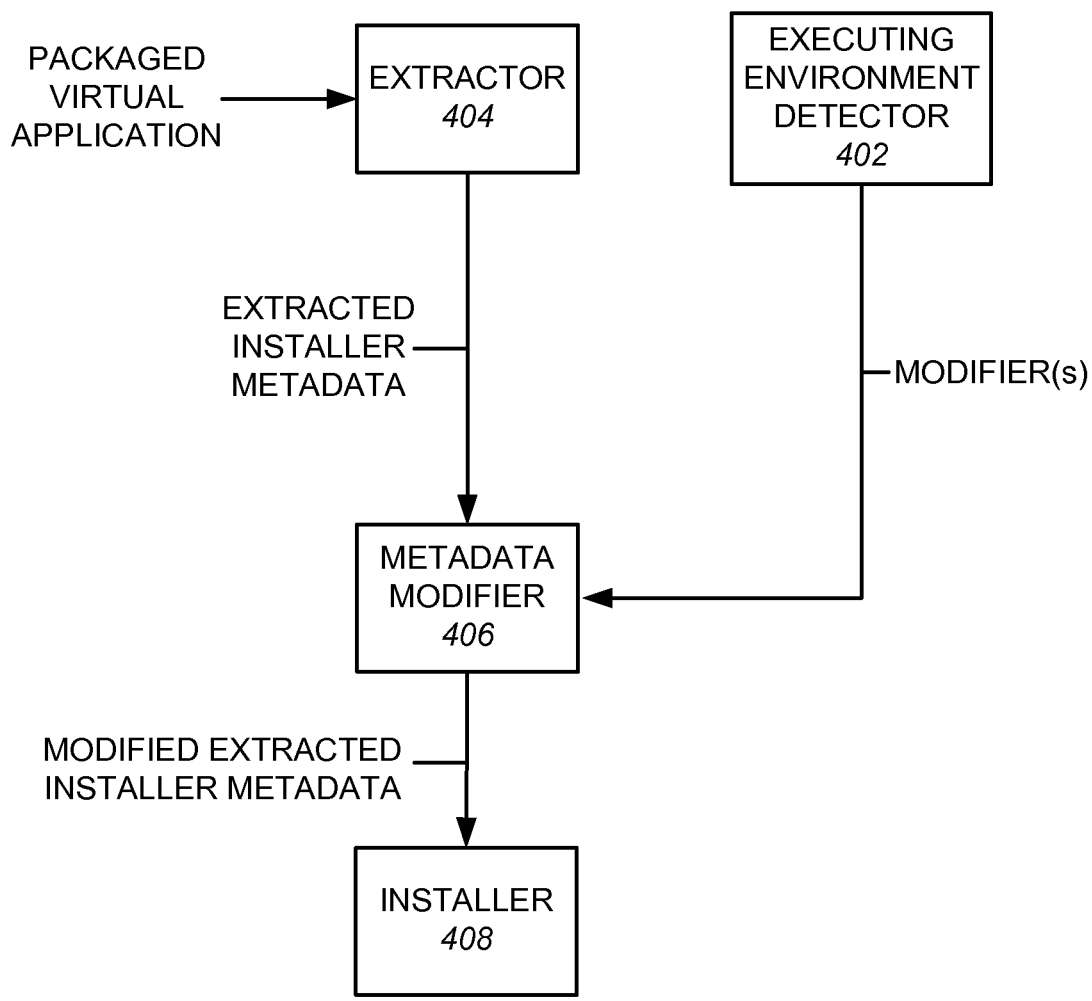
FIGS. 4 and 5 are functional block diagrams illustrating an exemplary implementation of an embodiment consistent with the subject matter of this disclosure.

FIG. 4 illustrates a functional block diagram of an embodiment in which installer metadata is modified. Each block may represent hardware, software, or a combination thereof which may be implemented within a processing device. The functional block diagram includes an executing environment detector 402, an extractor 404, a metadata modifier 406, and an installer 408.

Before launching installer 408 to install a virtual application, which may be packaged to execute on a processing device having an executing environment including a 32-bit operating system, extractor 404 may extract installer metadata from the packaged virtual application. The extracted installer metadata may then be provided to metadata modifier 406.

Executing environment detector 402 may detect the executing environment of the processing device by checking a value in a hierarchically-structured data store, such as a registry or other hierarchically-structured data store, checking a particular memory location or group of memory locations, or by other methods. Executing environment detector 402 may then determine a mapping from a first key path referenced by a virtual application to a second key path by matching the detected executing environment to one set of rules from among a number of sets of rules. Each of the sets of rules may include one or more modifiers for modifying one or more key paths of the hierarchically-structured data store for respective executing environments. Executing environment detector 402 may set one or more modifiers for use by metadata modifier 406 based on the one or more modifiers from a matching set of rules.

Metadata modifier 406 may determine whether any key paths, corresponding to any of the one or more modifiers, is present in the extracted installer metadata. If so, then metadata modifier 406 may modify the present key paths, corresponding to the one or more modifiers, as indicated by the one or more set modifiers. For example, a modifier may indicate that a key path of "HKLM\ROOT\SOFTWARE\CONTOSO" is to be modified to "HKLM\ROOT\SOFTWARE\WOW6432NODE\CONTOSO".

Metadata modifier 406 may provide the modified extracted installer metadata to installer 408, which may create one or more key paths of the hierarchically-structured data store as part of a process for installing the packaged virtual application.

Figure 5:
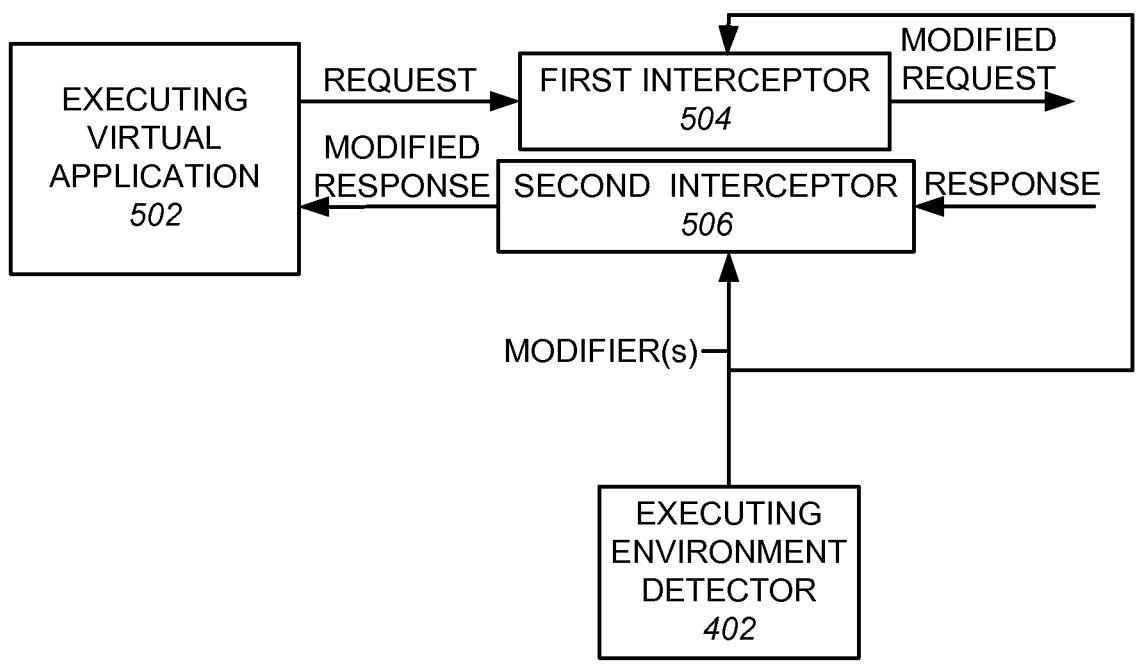

FIG. 5 is a functional block diagram showing functional blocks corresponding to functions that are employed when executing the installed virtual application. FIG. 5 includes executing environment detector 402, an executing virtual application 502, first interpreter 504, and second interpreter 506.

As previously mentioned, before executing the virtual application, executing environment detector 402 may detect an executing environment of the processing device by checking a value in a hierarchically-structured data store, such as a registry or other data store, checking a particular memory location or group of memory locations, or by other methods. Executing environment detector 402 may then match the detected executing environment to one of a number of sets of rules. Each of the sets of rules may include one or more modifiers for modifying one or more key paths of the hierarchically-structured data store for respective executing environments. Executing environment detector 402 may then provide one or more modifiers from a matching set of rules to first interpreter 504 and second interpreter 506.

When executing virtual application 502 makes a request to read, write, or modify a value in the hierarchically-structured data store at a location specified by a first key path, first interceptor 504 may intercept the request and may determine whether the first key path included in the request matches a second key path included in one of the one or more modifiers. If the first key path included in the request does match the second key path in one of the one or more modifiers, then first interceptor 504 may modify the first key path as indicated by the matching one of the one or more modifiers. First interceptor 504 may then release the modified request, such that the modified request may be processed to read, write, or modify a location of the hierarchically-structured data store specified by the modified key path.

Second interceptor 506 may intercept a response to the modified request and may determine whether a third key path included in the response matches a fourth key path in one of the one or more key paths of the one or more modifiers. If the third key path does match the fourth key path in one of the one or more key paths of the one or more modifiers, then second interceptor 506 may modify the third key path of the response as indicated by the matching one of the one or more modified modifiers, such that the modified fourth key path included in the response matches an original key path of the request, before being modified. Second interceptor 506 may then release the modified response, such that the modified response may be received by executing virtual application 502. Thus, from a point of view of executing virtual application 502, requests to read, write, or modify a value within the hierarchically-structured data store are sent and received. However, a recipient of the requests may receive the requests with one or more modified key paths and may provide corresponding responses including the one or more modified key paths. Corresponding responses may be modified such that one or more key paths included in a respective response may match an original key path included in a corresponding request before the respective responses are provided to executing virtual application 502.

As one can see, in various embodiments, first interceptor 504 and second interceptor 506, respectively, may modify requests and responses, transparently with respect to executing virtual application 502.

Exemplary Processing

Figure 6:
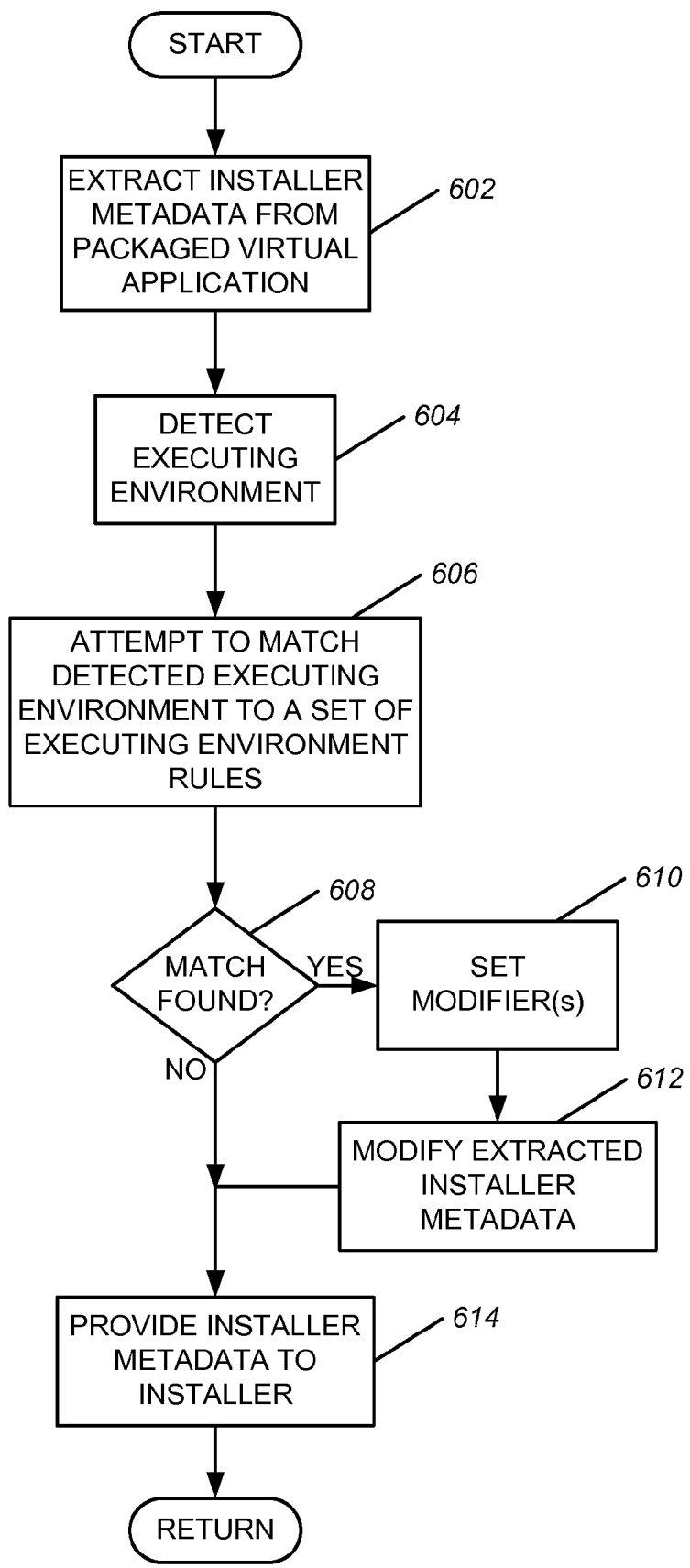
FIG. 6 is an exemplary flowchart of a process for modifying extracted installer metadata in an embodiment consistent with the subject matter of this disclosure.

FIG. 6 is a flowchart of an exemplary process that may be performed in various embodiments executing within a processing device. The process may begin with extractor 404 extracting installation metadata from a packaged virtual application (act 602). Next, executing environment detector 402 may detect an executing environment within the processing device (act 604). The executing environment may be detected by reading a specific location within a hierarchically-structured data store, such as, for example, a registry or other hierarchically-structured data store, by reading a particular memory address or a particular group of memory addresses, or by another method.

Executing environment detector 402 may then attempt to match the detected executing environment to one of one or more sets of executing environment rules (act 606). Each of the one or more sets of executing environment rules may include one or more modifiers and an executing environment indicator that provides an indication of a particular executing environment. Each of the one or more modifiers may include a first key path as may be referenced by a virtual application and a second key path representing a modified first key path.

Executing environment detector 402 may determine if a matching one of the one or more sets of executing environment rules was found (act 608). If the matching one of the one or more sets of executing environment rules was found, then executing environment detector 402 may determine a mapping from a reference to a first key path to a reference to a second key path by setting one or more modifiers (act 610). The one or more modifiers may be set by copying the one or more modifiers from the matching one of the one or more sets of executing environment rules. Metadata modifier 406 may then modify the extracted installer metadata by changing key paths, which match a first key path of the copied one or more modifiers to a corresponding second key path of the copied one or more modifiers (act 612). The modified extracted installer metadata may then be provided to installer 408, which may create key paths in a hierarchically-structured data store based on the modified extracted installer metadata.

If, during act 608, executing environment detector 402 determines that a matching one of the one or more sets of executing environment rules was not found, then an assumption may be made that no key paths included in the extracted installer metadata may be modified and the extracted installer metadata may be provided unchanged to installer 408 (act 614).

Figure 7:
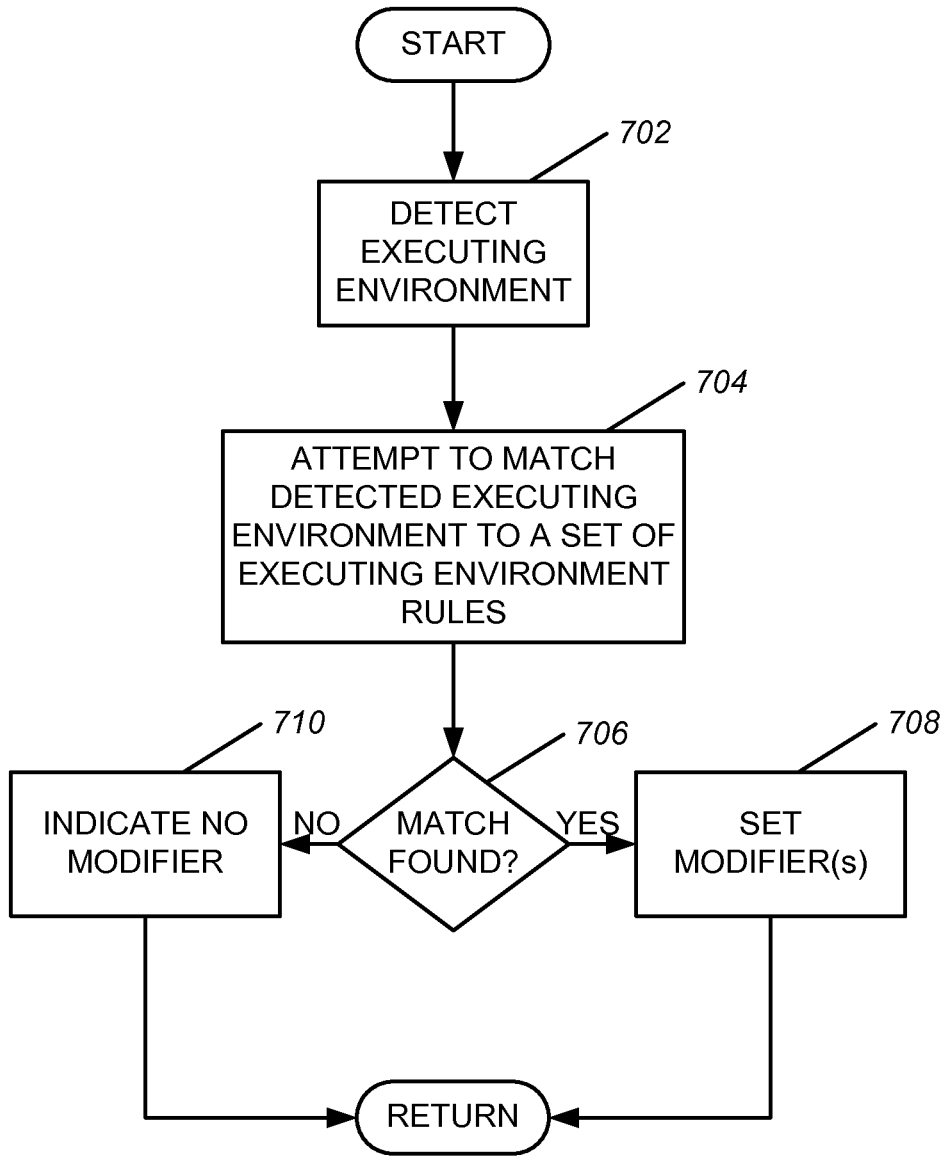
FIG. 7 is an exemplary flowchart of a process for detecting an executing environment of a processing device and preparing to modify one or more key paths based on the detected executing environment.

FIG. 7 is a flowchart of an exemplary process, which may be performed in embodiments consistent with the subject matter of this disclosure. The exemplary process may be performed when executing virtual application 502 begins to execute.

The process may begin with exemplary environment detector 402 detecting an executing environment on a processing device (act 702). As previously mentioned, the executing environment may be detected by reading a specific location within a hierarchically-structured data store, such as, for example, a registry or other hierarchically-structured data store, by reading a particular memory address or a particular group of memory addresses, or by another method.

Executing environment detector 402 may determine a mapping from a first key path referenced by a virtual application to a second key path based on the detected executing environment by attempting to match the detected executing environment to one of one or more sets of executing environment rules (act 704). As previously mentioned, each of the one or more sets of executing environment rules may include one or more modifiers and an executing environment indicator that provides an indication of a particular executing environment. Each of the one or more modifiers may include a key path as may be referenced by a virtual application and a key path representing a modified key path. Thus, each of the one or more modifiers of the one or more sets of executing environment rules may define a first key path, which may be referenced by a virtual application, and a corresponding second key path, representing a modified first key path.

Executing environment detector 402 may determine if a matching one of the one or more sets of executing environment rules was found (act 706). If the matching one of the one or more sets of executing environment rules was found, then executing environment detector may set one or more modifiers by copying the one or more modifiers from the matching one of the one or more sets of executing environment rules (act 708). The process may then be completed.

If, during act 706, executing environment detector 402 determines that a matching one of the one or more sets of executing environment rules was not found, then an assumption may be made that no key paths may be modified and an indicator may be set to indicate an absence of modifiers (act 710). The process may then be completed.

Figure 8:
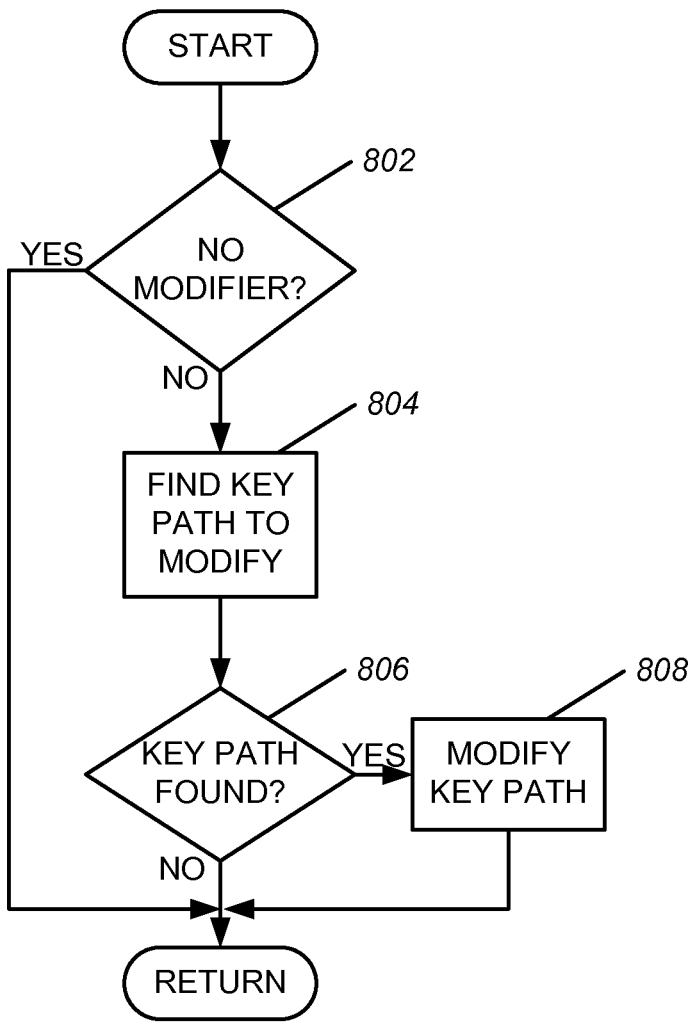
FIG. 8 is an exemplary flowchart of a process for modifying a key path included in a request from the virtual circuit and a key path included in a response to the request.

FIG. 8 is a flowchart of an exemplary process that may be performed by an embodiment of first interceptor 504 within a processing device. The process may be performed when a request, from executing virtual application 502, to read, write, or modify a hierarchically-structured data store, such as, for example, a registry, or other hierarchically-structured data store, is intercepted.

The process may begin with first interceptor 504 determining whether at let one modifier was set during act 708 (act 802). If the at least one modifier was not set, then first interceptor 504 may be completed and the intercepted request may be released for processing to continue.

If, during act 802, first interceptor 504 determines that at last one modifier was set, then first interceptor 504 may attempt to find a key path, within the intercepted request, that matches one of the at least one modifier (act 804). First interceptor 504 may then determine whether a matching key path was found (act 806). If the matching key path was found, then first interceptor 504 may modify the found key path in the intercepted request as indicated by a corresponding one of the at least one modifier (act 808) and the intercepted request may be released for processing to continue.

If, during act 806, first interceptor 504 determines that the matching key path was not found, then the intercepted request may be released for processing to continue.

The flowchart of FIG. 8 may also explain exemplary processing with respect to second interceptor 506. Second interceptor 506 may be executed when a response to a request to read, write, or modify the hierarchically-structured data store is intercepted.

The process may begin with second interceptor 506 determining whether at let one modifier was set during act 708 (act 802). If the at least one modifier was not set, then second interceptor 506 may release the intercepted response such that the intercepted response may be received by executing virtual application 502.

If, during act 802, second interceptor 506 determines that the at last one modifier was set, then second interceptor 506 may attempt to find a key path within the intercepted response that matches a key path included in one of the at least one modifier, representing a modified key path (act 804). Second interceptor 506 may then determine whether a matching key path, within the intercepted response, was found (act 806). If the matching key path was found, then second interceptor 506 may modify the found key path in the intercepted request, as indicated by an unmodified key path included in the matching one of the at least one modifier and the intercepted response may be released, such that executing virtual application 502 may receive the modified response (act 808).

If, during act 806, second interceptor 506 determines that the matching key path was not found, then the intercepted response may be released for executing virtual application 502 to receive the response.

Miscellaneous

Although the above exemplary embodiments refer to a 32-bit virtual application executing in an executing environment including a 64-bit operating system, other embodiments may include a virtual application packaged for any particular executing environment and executing the virtual application in an executing environment different from an executing environment for which the virtual application was packaged.

CONCLUSION

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Other configurations of the described embodiments are part of the scope of this disclosure. For example, in other embodiments, an order of acts performed by a process, such as the processes illustrated in FIGS. 6-8, may be different and/or may include additional or other acts.

Accordingly, the appended claims and their legal equivalents define embodiments, rather than any specific examples given.

We claim as our invention:

1. A computer readable storage medium that is at least one hardware storage device and that comprises:
    a packaged application configured for operating in a first executing environment and not configured for operating in a second executing environment, where the first executing environment is different from the second operating environment;
    a set of rules that include a mapping of at least one first key path in the first executing environment to a second key path in the second operating environment; and
    computer-executable instructions that, based on execution by a computer, configure the computer to perform actions to install the packaged application on a processing device, the actions comprising:
        automatically modifying the at least one first key path located in installer metadata that is associated with the application to the at least one second key path;
        providing the modified installer metadata to an installer; and
        installing, via the installer, the application on the processing device according to the modified installer metadata.

2. The computer readable storage medium of claim 1 further comprising:
    an extractor configured to extract metadata from the packaged application, the extracted metadata including information with respect to at least one first key path.

3. The computer readable storage medium of claim 2 further comprising:

a metadata modifier configured to modify the extracted metadata by mapping the at least one first key path to at least one second key path in the second executing environment.

4. The computer readable storage medium of claim 1 wherein the packaged application and the set of rules are disposed on the same computer readable storage medium.

5. The computer readable storage medium of claim 1 wherein the packaged application and the set of rules are disposed on different computer readable storage media.

6. The computer readable storage medium of claim 1, the actions further comprising:
   detecting an executing environment of a processing device;
   determining from the set of rules a mapping from a third key path referenced by the application in the second executing environment to a fourth key path in the executing environment of the processing device; and
   modifying a request from the application for the third key path to the fourth key path according to the determined mapping.

7. The computer readable storage medium of claim 6, the actions further comprising:
   modifying a response to the modified request from the application by modifying the fourth key path to the third key path based on the mapping.

8. A computer readable storage medium that is at least one hardware storage device and that comprises:
   a packaged application configured for operating in a first executing environment and not configured for operating in a second executing environment;
   an extractor configured to extract metadata from the packaged application, the extracted metadata including information with respect to at least one first key path in the first executing environment;
   a metadata modifier configured to modify the extracted metadata by mapping the at least one first key path to at least one second key path in the second executing environment that is different from the first executing environment, and
   computer-executable instructions that, based on execution by a computer, configure the computer to perform actions to install the packaged application on a processing device, the actions comprising:
      automatically modifying, via the metadata modifier, the at least one first key path in extracted metadata associated with the application to the at least one second key path;
      providing the modified metadata to an installer; and
      installing, via the installer, the application on the processing device according to the modified metadata.

9. The computer readable storage medium of claim 8 further comprising:
   a rules matching component configured to select a set of rules from a plurality of rules, the set of rules including a mapping of at least one key path in the first executing environment to the at least one key path in the second executing environment.

10. The computer readable storage medium of claim 9 wherein the plurality of rules comprises a set of rules for at least two different executing environments that are different from the first executing environment.

11. The computer readable storage media of claim 9 wherein the plurality of rules are disposed on the computer readable storage medium.

12. The computer readable storage medium of claim 8 further comprising:
   an executing environment detector component configured to detect the executing environment of a processing device and to match the detected executing environment to one of a plurality of sets of rules defined for a plurality of executing environments.

13. A system comprising:
   at least one hardware processing device;
   at least one memory device;
   a packaged application configured for operating in a first executing environment and not configured for operating in a second executing environment;
   an extractor configured to extract metadata from the packaged application, the extracted metadata including information with respect to at least one first key path in the first executing environment;
   a metadata modifier configured to modify the extracted metadata by mapping the at least one first key path to at least one second key path in the second executing environment that is different from the first executing environment; and
   a rules matching component configured to select a set of rules from a plurality of rules, the selected set of rules including a mapping of the at least one first key path to the at least one second key path; and
   instructions that, based on execution by the at least one hardware processing device, configure the system to perform actions to install the packaged application on a computing device, the actions comprising:
      automatically modifying, via the metadata modifier, the at least one first key path in extracted metadata associated with the application to the at least one second key path;
      providing the modified metadata to an installer; and
      installing, via the installer, the application on the computing device according to the modified metadata.

14. The system of claim 13 wherein the plurality of rules are disposed on the system.

15. The system of claim 13 wherein the plurality of rules are disposed on a device remote from the system.

16. The system of claim 13 wherein the plurality of rules are a component of the packaged application.

17. The system of claim 13 wherein the first key path corresponds to a key path of a registry data store.

18. A system comprising:
   at least one hardware processing device;
   at least one memory device;
   a second executing environment;
   a packaged application configured for operating in a first executing environment that is different from the second executing environment;
   a set of rules that include a mapping of at least one key path in the first executing environment to a second key path in the second operating environment; and
   instructions that, based on execution by the at least one hardware processing device, configure the system to perform actions to install the packaged application on a computing device, the actions comprising:
      automatically modifying the at least one first key path located in installer metadata that is associated with the application to the at least one second key path;
      providing the modified installer metadata to an installer; and
      installing, via the installer, the application on the computing device according to the modified installer metadata.

19. The system of claim 18 further comprising:
an extractor configured to extract the metadata from the packaged application, the extracted metadata including information with respect to the at least one first key path.

20. The system of claim 19 further comprising:
a metadata modifier configured to modify the extracted metadata by mapping the at least one first key path to at least one second key path.

21. The system of claim 20 further comprising:
the installer that is configured to receive from the modified metadata and to install the packaged application on the computing device according to the modified metadata.

* * * * *